United States Patent
Azulay et al.

(10) Patent No.: US 12,360,827 B1
(45) Date of Patent: Jul. 15, 2025

(54) EVENT MESSAGE BUFFER AND METHOD OF EFFECTIVE GUARANTEED EVENT MESSAGE BUFFERING

(71) Applicant: Marvell Israel (M.I.S.L) Ltd., Yokne'am (IL)

(72) Inventors: Yaniv Azulay, Nes-Ziona (IL); Lev Vaskevich, Herzeliya (IL); Liat Korman, Petah-Tikva (IL)

(73) Assignee: Marvell Israel (M.I.S.L) Ltd., Yokne'am (IL)

( * ) Notice: Subject to any disclaimer, the term of this patent is extended or adjusted under 35 U.S.C. 154(b) by 0 days.

(21) Appl. No.: 16/698,348

(22) Filed: Nov. 27, 2019

Related U.S. Application Data

(60) Provisional application No. 62/771,890, filed on Nov. 27, 2018.

(51) Int. Cl.
*G06F 9/54* (2006.01)

(52) U.S. Cl.
CPC .............. *G06F 9/542* (2013.01); *G06F 9/544* (2013.01)

(58) Field of Classification Search
CPC .................................. G06F 9/542; G06F 9/544
See application file for complete search history.

(56) References Cited

U.S. PATENT DOCUMENTS

| | | | | |
|---|---|---|---|---|
| 4,747,100 A * | 5/1988 | Roach | ................... | H04L 12/417 370/452 |
| 4,833,600 A * | 5/1989 | Brodsky | ................... | H04Q 9/14 709/250 |
| 4,851,829 A * | 7/1989 | DeLuca | ................ | G08B 3/1066 340/7.52 |
| 5,371,850 A * | 12/1994 | Belsan | ..................... | G06F 9/546 719/314 |
| 5,889,943 A * | 3/1999 | Ji | .......................... | G06F 21/564 713/188 |
| 6,014,710 A * | 1/2000 | Talluri | ..................... | H04L 29/06 709/219 |
| 6,408,365 B1 * | 6/2002 | Hosomi | .............. | G06F 12/0813 711/120 |
| 9,385,976 B1 * | 7/2016 | Hafri | ................... | H04L 49/9042 |
| 9,811,403 B1 * | 11/2017 | Sur | .......................... | G06F 9/546 |
| 2002/0188659 A1 * | 12/2002 | Ohashi | ...................... | H04L 9/40 709/224 |
| 2004/0167964 A1 * | 8/2004 | Rounthwaite | ........ | G06Q 10/107 709/206 |
| 2004/0170432 A1 * | 9/2004 | Reynolds | ................ | H04L 12/46 398/49 |
| 2004/0205770 A1 * | 10/2004 | Zhang | .................. | G06Q 20/401 719/313 |
| 2005/0021622 A1 * | 1/2005 | Cullen | .................... | H04L 45/00 709/204 |

(Continued)

*Primary Examiner* — Kevin L Young
*Assistant Examiner* — Phuong N Hoang

(57) ABSTRACT

An event message buffer queues event messages from a number of system components. Upon receiving an event message from a system component, the event message buffer compares the event message with a pending event message from the same component. If the event message is the same as the pending event message, the event message is not queued. If the event message differs from the pending event message, the event message is queued. Upon receiving a read request, the event message buffer only transmits the queued event message if it is different from the previously sent event message.

22 Claims, 5 Drawing Sheets

(56) References Cited

U.S. PATENT DOCUMENTS

| | | | |
|---|---|---|---|
| 2005/0188037 A1* | 8/2005 | Hamaguchi | G06Q 10/107 |
| | | | 709/206 |
| 2005/0204120 A1* | 9/2005 | Prasky | G06F 9/325 |
| | | | 712/238 |
| 2005/0238041 A1* | 10/2005 | Hsu | H04W 48/18 |
| | | | 370/441 |
| 2006/0048162 A1* | 3/2006 | Boult | G06F 9/30072 |
| | | | 719/310 |
| 2009/0187817 A1* | 7/2009 | Ivashin | H04N 1/00244 |
| | | | 715/230 |
| 2010/0208644 A1* | 8/2010 | Ghosn | G06Q 30/02 |
| | | | 705/26.1 |
| 2011/0282893 A1* | 11/2011 | Dolin | G06Q 50/01 |
| | | | 707/769 |
| 2012/0143985 A1* | 6/2012 | Constien | H04L 12/6418 |
| | | | 709/217 |
| 2013/0024780 A1* | 1/2013 | Sutedja | G06Q 10/107 |
| | | | 715/752 |
| 2013/0191333 A1* | 7/2013 | Long | G06F 16/273 |
| | | | 707/613 |
| 2015/0106936 A1* | 4/2015 | Rihn | G06F 21/562 |
| | | | 726/23 |
| 2015/0281900 A1* | 10/2015 | Willart | H04W 4/12 |
| | | | 455/456.1 |
| 2015/0349906 A1* | 12/2015 | Christensen | H04L 47/50 |
| | | | 398/58 |
| 2015/0378796 A1* | 12/2015 | Word | G06F 9/546 |
| | | | 709/203 |
| 2016/0043977 A1* | 2/2016 | Schwetman, Jr. | G06F 3/067 |
| | | | 709/206 |
| 2016/0103783 A1* | 4/2016 | Allen | H04L 67/104 |
| | | | 709/212 |
| 2018/0091473 A1* | 3/2018 | Wijnands | H04L 61/103 |
| 2019/0042335 A1* | 2/2019 | Flajslik | G06F 9/544 |
| 2019/0207887 A1* | 7/2019 | Kasheff | H04L 51/212 |

* cited by examiner

# EVENT MESSAGE BUFFER AND METHOD OF EFFECTIVE GUARANTEED EVENT MESSAGE BUFFERING

CROSS-REFERENCE TO RELATED APPLICATION

This disclosure claims the benefit under 35 U.S.C. § 119 (e) of U.S. Provisional Patent Application No. 62/771,890, filed Nov. 27, 2018, which is hereby incorporated by reference herein in its entirety.

FIELD OF USE

This disclosure relates to event message queueing and buffering of event messages.

BACKGROUND OF THE DISCLOSURE

The background description provided herein if for the purpose of generally presenting the context of the disclosure. Work of the inventors hereof, to the extent the work is described in this background section, as well as aspects of the description that do not otherwise qualify as prior art at the time of filing, are neither expressly nor impliedly admitted to be prior art against the present disclosure.

In computer systems, many components output event messages reporting the occurrence of various events, including reporting their current status. These event messages may be transmitted from various components at a high rate while a processor or other component may read the event messages at a slower rate. To compensate for the difference in rates, the event messages typically are queued in a memory buffer, such as a first-in/first-out (FIFO) memory buffer. However, the difference in rates may be so great at times that the buffer becomes full and cannot accept any additional event messages for queueing, resulting in a loss of some event messages.

SUMMARY

Event messages from system components are received at an event message buffer. Event messages may be received from system components at a first rate and read out of the event message buffer at a second, slower rate. Event message may be received from a set number of system components. The event message buffer receives a first event message from a first system component and queues the first event message. The event message buffer then receives a second event message from the same system component. The event message buffer compares the second event message with the first event message and, if the second event message is the same as the first event message, the second event message is not queued. If the second event message is different from the first event message, the event message buffer may replace the first event message with the second event message.

In some embodiments, the event message buffer identifies the system component from which the first event message is received and queues the first event message in a memory location of the event message buffer corresponding to the identified system component. The event message buffer may determine whether the first event message has been read. If the first event message has been read, then the second event message is queued in the event message buffer.

In some embodiments, the event message buffer accesses a storage location associated with the system component and updates a flag in the storage location to indicate a queued event message. To determine if the first event message has been read, the event message buffer may access the storage location associated with the system component determine whether the value of the flag stored in the storage location indicates a queued event message.

In some embodiments, if the first event message has already been read, the event message buffer may compare the first event message with the second event messages by accessing content of the second event message and a storage location associated with the system component in which content of a previously-read event message is stored. The event message buffer then compares the content of the second event message with the stored content of the first event message.

In some embodiments, the event message buffer comprises two sets of storage locations, each set of storage locations having a number of locations equal to the set number. The event message buffer may, in some embodiments, update a flag in a first storage location associated with the system component to indicate a queued event message. In response to receiving a read request, the event message buffer may send the first event message from the corresponding queue and update the flag in the first storage location to indicate that no event message is queued in the corresponding queue. The event message buffer then updates a second storage location associated with the system component to reflect content of the sent event message.

In some embodiments, in response to receiving a read request, the event message buffer compares the queued event message with a previously sent event message. The event message buffer sends the queued event message only in response to determining, based on the comparing, that the queued event message is different from the previously sent event message.

BRIEF DESCRIPTION OF THE DRAWINGS

Further features of the disclosure, its nature and various advantages will become apparent upon consideration of the following detained description, taken in conjunction with the accompanying drawings, in which like reference characters refer to like parts throughout, and in which.

DETAILED DESCRIPTION

Figure 1:
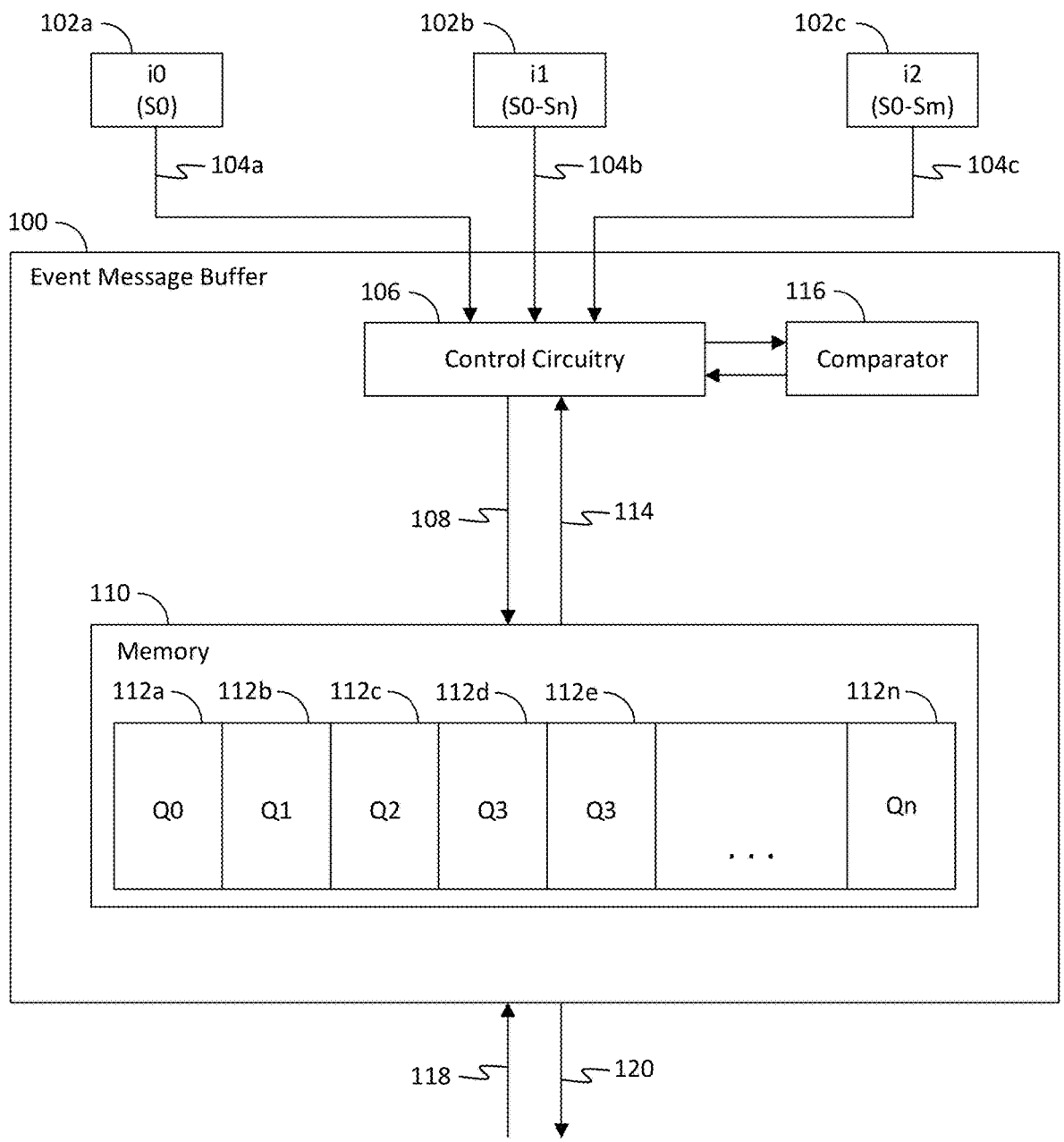
FIG. 1 is a block diagram illustrating components of an event memory buffer and data flow to, from, and within the event memory buffer for queueing and sending event messages in accordance with some implementations of the subject matter of the present disclosure.

Typical data buffers queue incoming data from various source components or devices for delivery to at least one other component or device. For example, a network router may contain a buffer that queues incoming packets from each networked device for delivery to other network devices. In computer systems, event message buffers queue incoming event messages for delivery regardless of the type or content of the incoming event message. Event message buffers typically receive and queue event messages from a number of system components and often are capable of queueing only one event message per system component. Event messages are also typically received at a high rate but read at a slower rate. For example, multiple system components may send an event message substantially simultaneously while only one messages can be read out of the buffer at a time. As another example, some system components may send event more rapidly at some times than at other times. This results in the event message buffer becoming full and incapable of queueing additional event messages. If a new event message is received from a system component before a queued event message from that system component is read, the new event message cannot be queued and may be lost.

Conventional systems simply drop or discard new event messages if the event message buffer is full. If the type or content of an event message received from a first system component is identical to that of the previous message received from that same system component, the loss of that event message may not be critical. However, if the state of the system component changes and a new event message is transmitted by the system component, that new event message may not be queued if the previous message has not yet been read, resulting in loss of the more up-to-date event message. As described herein, system implementations are provided to best ensure, even if the message read rate is slower than the message receive rate, that the most recent event message from each system component is not lost, dropped, or discarded when the new message differs from the currently queued event message from each respective system component.

Implementations of the subject matter of the present disclosure prevent the loss of event messages and ensure that all relevant event messages are properly queued.

Specifically, the subject matter of the present disclosure provides a way to determine whether to queue or ignore an incoming event message from a given system component by determining whether an event message from that system component is currently queued and, if so, comparing the type and/or content of the queued event message with that of the incoming event message. If the type and/or content of the queued event message is the same as the type and/or content of the incoming event message, the incoming event message need not be queued and may be ignored. If the type and/or content of the incoming event message is different from the type and/or content of the queued event message, then the incoming event message overwrites the queued event message. Thus, the type and/or content of an event message read out of the event message buffer is always the type and/or content of the most recent event message received from each system component.

The event message buffer may receive event messages from multiple system components. Some system components may have dedicated interfaces with the event message buffer. Other system components may share an interface with the event message buffer, with the number of system components using the same interface being dependent on the bandwidth of the interface. Some system components may send a constant stream of event messages. So long as the status of the system component is unchanged, each event message will be the same as the previous event message. Once the status of the system component changes, the messages send by the system component will reflect the new state. In some implementations, especially where processing resources are limited, the event message most recently received from a particular system component can simply overwrite any previously queued event message from that system component. Overwriting a queued event message from a system component ensures that the most up-to-date message is read from the event message buffer. In other implementations, however, status flags and other data structures are used to monitor receipt, reading, and type or content of event messages from each system component and only new event messages from each system component having a type or content that differs from that of a queued event message from the respective system component will overwrite the queued event message. For example, a pending state data structure may hold the type or content of queued event messages and may also include a flag or other variable corresponding to each system component from which event messages are received indicating whether an event message is currently queued for each system component. The event message buffer itself has, in an embodiment, a depth equal to the number of system components from which event messages are received, and stores only identifiers of locations in the pending state data structure. A sent state data structure may also be used to track the type or content of the most recently read event message for each system component. Identifiers stored in the event message buffer may be received from each system component as part of each respective event message.

Alternatively, the event message buffer may generate identifiers based on combination of an identifier received from each respective system component and an identifier of an interface on which the system component communicates with the event message buffer.

FIG. 1 is a block diagram illustrating components of an event memory buffer and data flow to, from, and within the event memory buffer for queueing and sending event messages in accordance with some implementations of the subject matter of the present disclosure. Event message buffer 100 is responsible for buffering event messages from several system components. A single system component S0 may communicate with event message buffer 100 through interface 102*a*. Other interfaces such as i1 102*b* and i2 102*c* may be shared by several system components S0-Sn and S0-Sm, respectively. Event message buffer 100 receives at 104*a* an event message from system component S0 on interface i0 102*a*, receives at 104*b* event messages from up to n system components (S0-Sn) on interface i1 102*b*, and receives at 104*c* event messages from up to m system components (S0-Sm) on interface i2 102*c*. Control circuitry 106 of event message buffer 100 receives each event message and at 108 stores each event message in memory 110. Memory 110 may be a FIFO memory buffer and may have a number of storage locations, or depth, equal to the number of system components from which event message buffer 100 receives event messages. The FIFO may be a register-based FIFO, a set of RAM data units stored as a linked list, or any other suitable type of FIFO, and may include storage locations, or queues, Q0-Qn (112*a*-112*n*), where n is the number of system components from which event message buffer 100 receives event messages.

When event message buffer 100 first receives an event message from a system component, such as S2 on interface i1 102*b*, control circuitry 106 queues the event message in memory 110. The event message content and/or type of the event message may be stored in a storage location of the FIFO, such as storage location 112*a*. Alternatively, the content and/or type of the event message may be stored in in a portion of a pending message data structure corresponding to the particular system component, while an identifier of the system component is stored in memory 110. Upon receiving a second event message from the same system component, control circuitry 106 at 114 retrieves the content and/or type of the first event message currently queued in memory 110. For example, control circuitry 106 retrieves the event content and/or type of the first event message from memory 110 by checking each storage location 112*a*-112*n* for an identifier corresponding to the particular system component. The content and/or type of the first event message may alternatively be retrieved from the portion of the pending message data structure corresponding to the particular system component. Control circuitry 106, using comparator 116, compares the content and/or type of the queued event message with that of the second event message received from the particular system component. If the content and/or type of the second event message is different from that of the queued event message, control circuitry 106 overwrites the queued event message in memory 110, either in the corresponding storage location 112*a* or in the corresponding portion of the pending message data structure, with the second event message.

Upon receiving read request 118 for an event message, event message buffer 100 transmits at 120 the next queued event message to the requesting component. As will be described below in connection with FIG. 2, a status flag may be updated to indicate that the queued event message has been read. This status flag may be used by control circuitry 106 in determining whether a comparison need be performed with a subsequent event message received from the same system component. As will be described below in connection with FIG. 5, the sending of the next queued event message by be canceled if the last sent event message is the same as the next queued event message.

Figure 2:
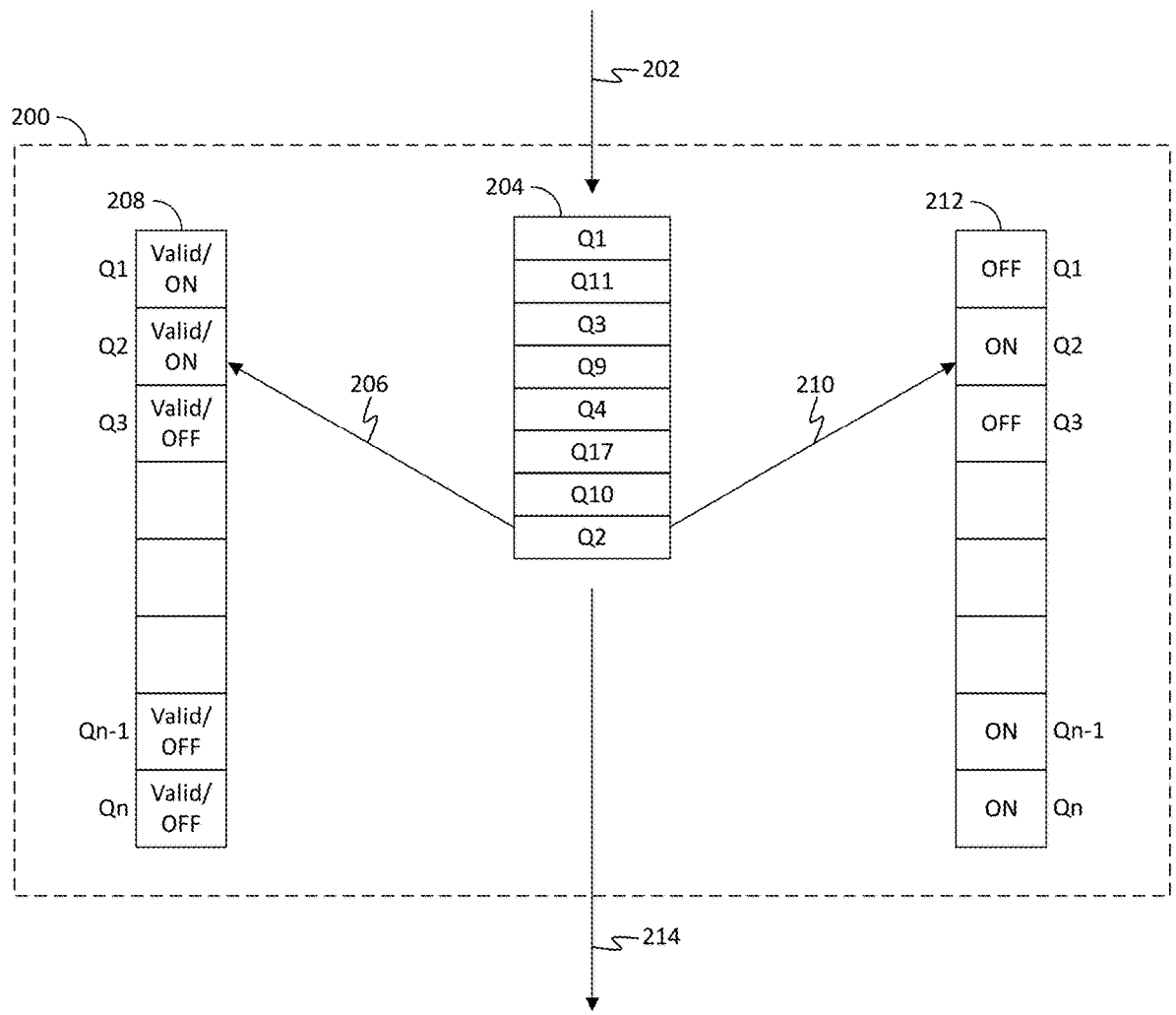
FIG. 2 is a block diagram of an event message buffer and related data structures for monitoring and managing queueing of event messages received at an event memory buffer such as that of FIG. 1 in accordance with some implementations of the subject matter of the present disclosure.

FIG. 2 is a block diagram of an event message buffer and related data structures for monitoring and managing queueing of event messages in accordance with some implementations of the subject matter of the present disclosure. Memory 200 at 202 receives an event message for queuing. After determining, based on comparison to a most recent previous event message from the same system component as described above, that the event message should be queued, the event message is queued in event message FIFO 204. The content and/or type of the event message is then copied at 206 to pending message data structure 208 and stored in a location in pending message data structure 208 corresponding to the system component from which the event message was received. For example, if the event message was received from system component S0 on interface i1, the content and/or type of the event message may be stored in location Q2 of pending message data structure 208. A flag or Boolean variable also stored in location Q2 in pending message data structure 208 is updated to indicate a pending event message.

Upon receiving a read request, the content and/or type of the next queued event message is copied at 210 to a corresponding location in sent message data structure 212. The event message is then transmitted at 214 to the requesting component and the flag or Boolean variable in the corresponding location in pending message data structure 208 is reset to indicate that there is no pending message from the corresponding system component. In some embodiments, in response to the read request, the content and/or type of the next queued event message is compared with the content and/or type of the last sent event message, and the next queued event message is only transmitted to the requesting component if the content and/or type of the next queued event message differs from that of the last sent event message. Otherwise, the sending of the next queued event message is canceled, and the flag or Boolean value in the corresponding location in pending message data structure 208 is resent to indicate that there is no pending message from the corresponding system component.

In some embodiments, the content or type of the event message is stored only in pending message data structure 208 and a memory address or other pointer to the location in pending message data structure 208 is stored in event message FIFO 204. When a read request is received, the pointer is retrieved from event message FIFO 204 and used to access pending message data structure 208. The requested event message in then retrieved from pending message data structure 208 and transmitted 214 to the requesting component.

Figure 3:
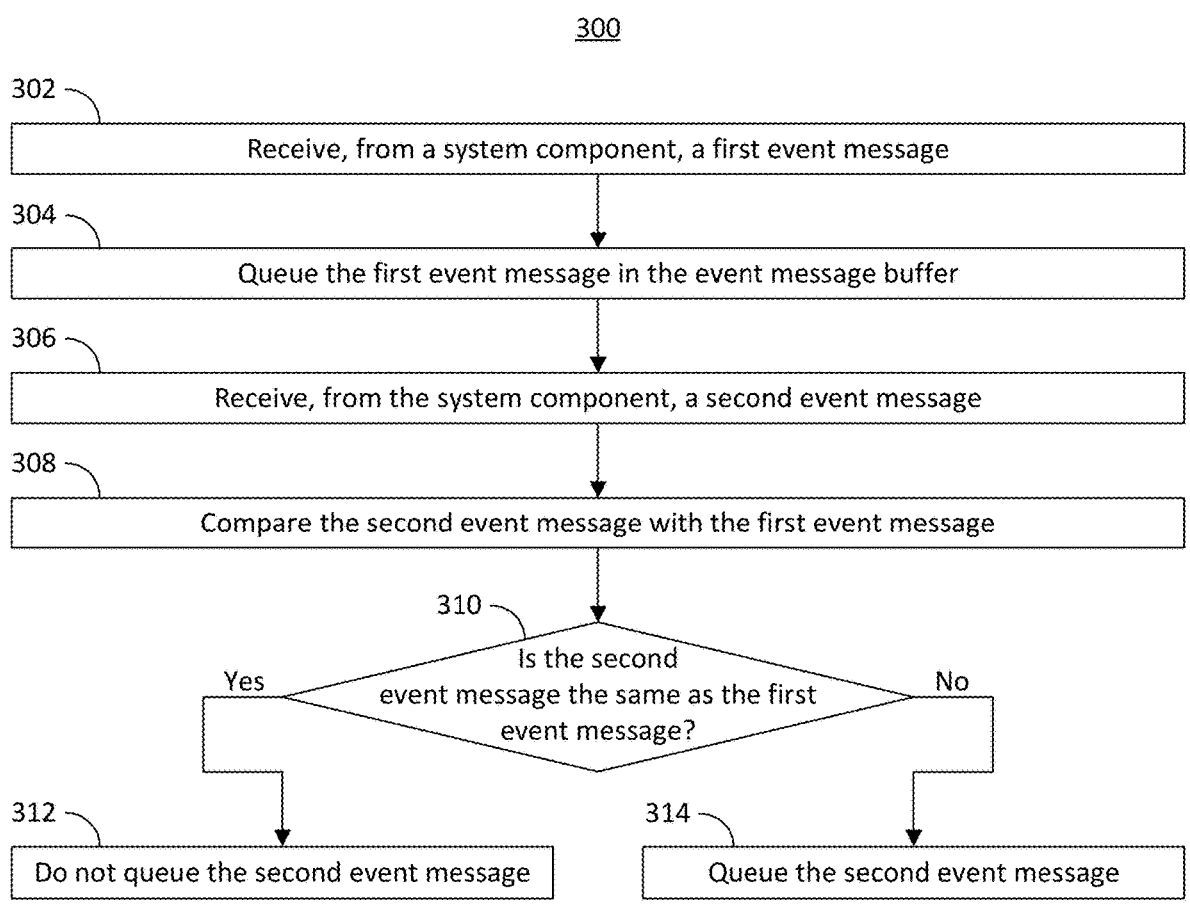
FIG. 3 is a flow diagram representing a process for queueing an event message in the event message buffer of FIG. 1 in accordance with some implementations of the subject matter of the present disclosure.

FIG. 3 is a flow diagram representing an illustrative process 300 for queueing an event message in accordance with some implementations of the subject matter of the present disclosure. At 302, the event message buffer (e.g., event message buffer 100) receives, from a system component, a first event message. For example, the system component may be a cache fetch unit and the event message buffer may be a memory controller. The event message may include the memory address or address bus identifier corresponding to the last fetched data. As another example, the system component may be a database counter unit and the event message buffer may be a database controller. The event message may include an identifier of a counter stored in the database and a value of that counter.

At 304, event message buffer 100 queues the first event message in a queue of event message buffer 100 corresponding to the system component from which the event message was received. At 306, event message buffer 100 receives a second event message from the same system component as that from which the first event message was received. At 308, event message buffer 100 (e.g., using control circuitry 106) compares the second event message with the first event message. For example, event message buffer 100 may compare the content or type of the second event message with the content or type of the first event message using any suitable data comparison methods. If the second event message is determined to be the same as the first event message, then, at 312, event message buffer 100 does not queue the second event message. With the second event message being identical to, and/or having identical content to, the first event message, there is no need to queue the second event message. If the second event message is not the same as the first event message, then, at 314, event message buffer 100 queues the second event message in place of the first event message. For example, event message buffer 100 overwrites the queued first event message with the newly received second event message.

Figure 4:
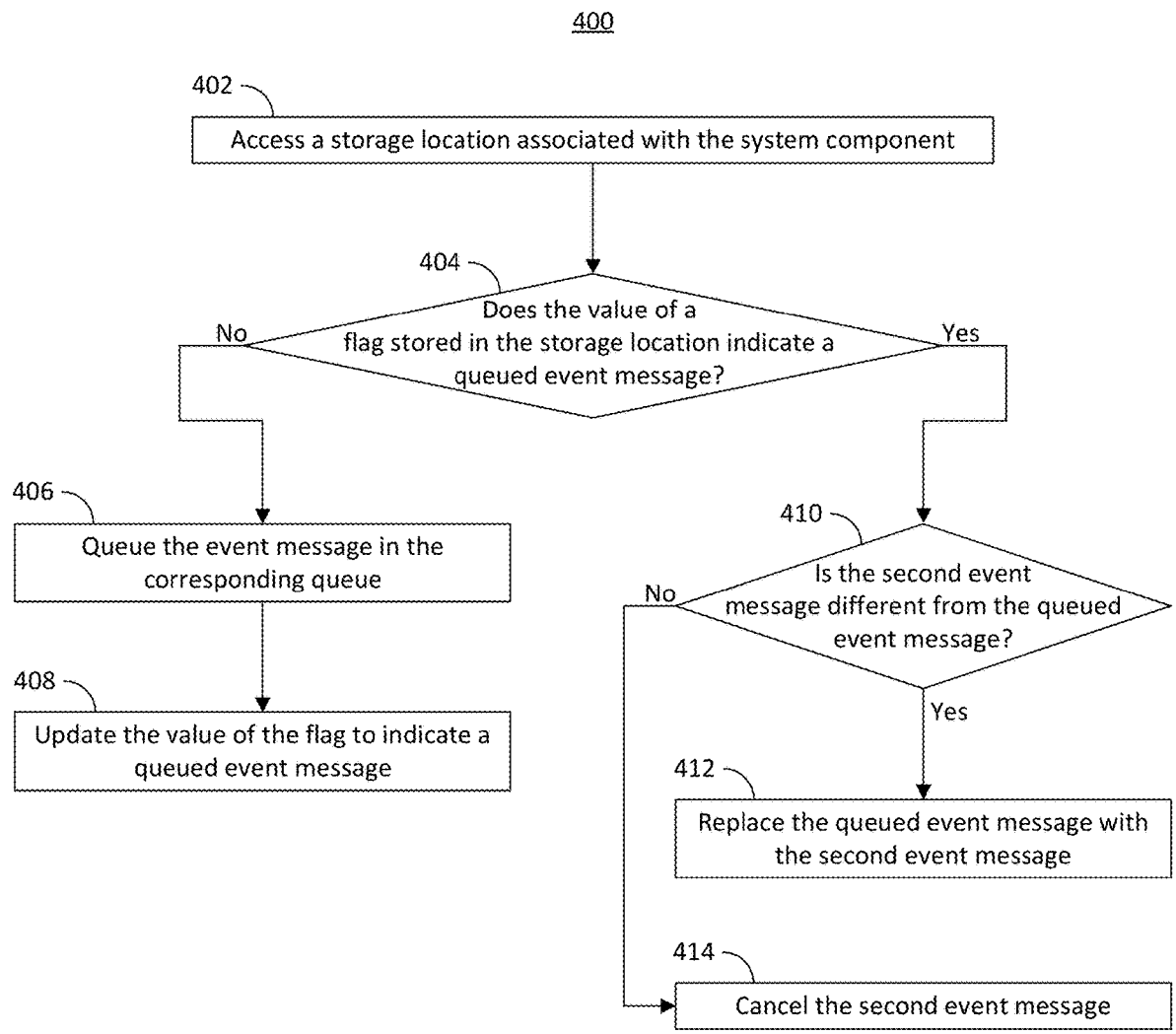
FIG. 4 is a flow diagram representing a process for managing queueing of event messages in the event message buffer of FIG. 1 in accordance with some embodiments of the subject matter of the present disclosure.

FIG. 4 is a flow diagram representing an illustrative process 400 for managing queueing of event messages in accordance with some embodiments of the subject matter of the present disclosure. At 402, upon receiving the second event message from the system component, event message buffer 100 (e.g., using control circuitry 106) accesses a storage location associated with the system component. For example, event message buffer 100 may determine an identifier of the system component and access a storage location in pending message data structure 208 corresponding to that identifier. At 404, event message buffer 100, using control circuitry 106, determines whether the value of a flag stored in the storage location indicates a queued event message previously received from the system component. For example, the flag may be a Boolean variable whose value is TRUE when an event message is queued and FALSE when no event message is queued. The flag may be set to TRUE when an event message is stored in the storage location, or when an event message is queued in the event message FIFO (e.g., event message FIFO 110). The flag may be set to FALSE when event message buffer 100 is first initialized, and when a queued event message is read.

If the value of the flag indicates that no event message is currently queued, then, at 406, event message buffer 100 queues the second event message from the system component in the corresponding queue and, at 408, updates the value of the flag to indicate a queued message. If the value of the flag does indicate that an event message is currently queued, then, at 410, event message buffer 100, using, for example, control circuitry 106 or comparator 116, determines whether the second event message is different from the queued event message. If so, then, at 412, event message buffer 100 replaces the queued event message with the second event message. If the second event message is the same and the queued event message, however, then, at 414, event message buffer 100 cancels the second event message. For example, event message buffer 100 may ignore or drop the second event message.

Figure 5:
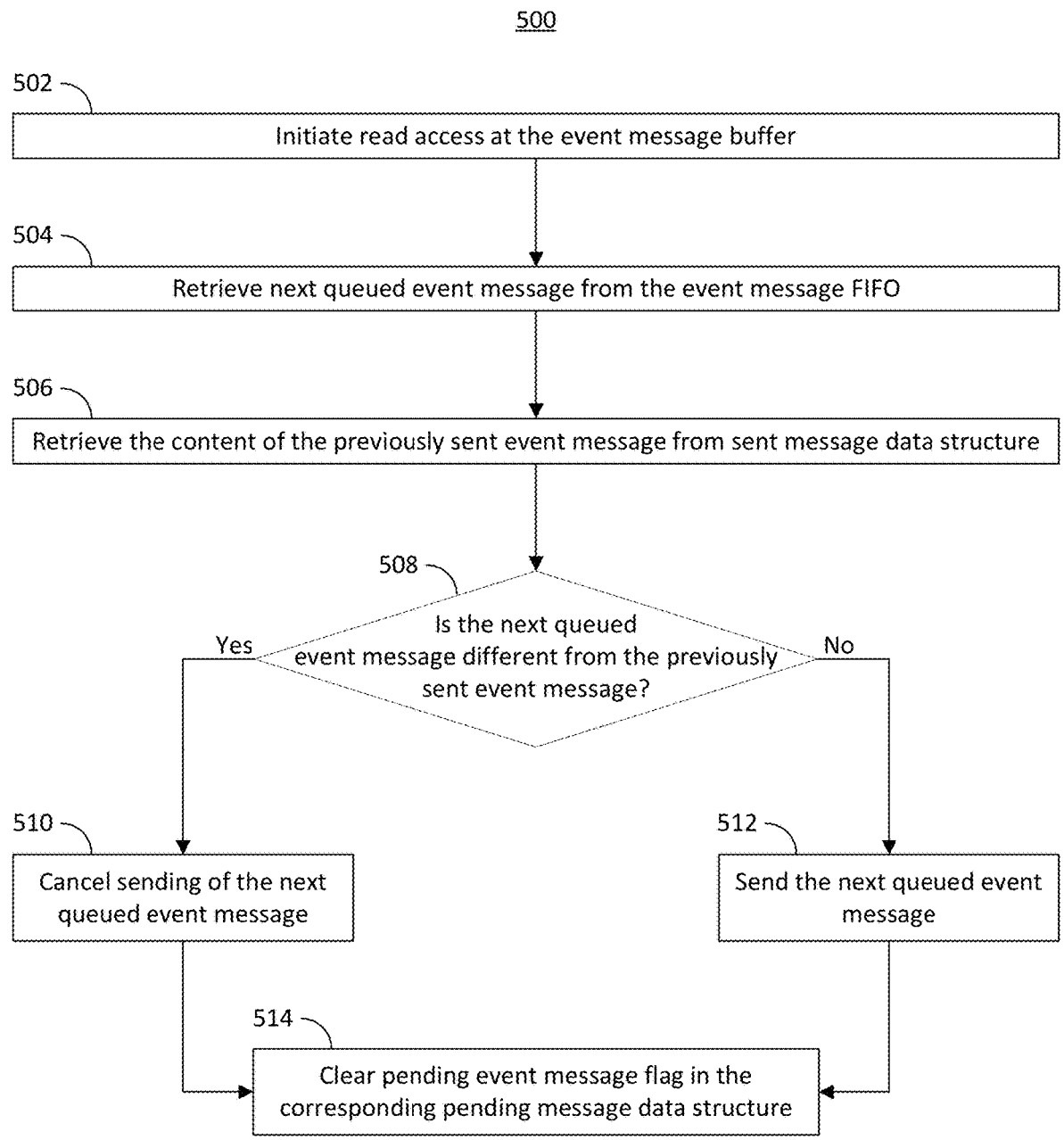
FIG. 5 is a flow diagram representing a process for determining whether to send a queued event message from the event message buffer of FIG. 1 in accordance with some embodiment of the subject matter of the present disclosure.

FIG. 5 is a flow diagram representing an illustrative process 500 for determining whether to send a queued event message from the event message buffer in accordance with some embodiments of the subject matter of the present disclosure. At 502, read access is initiated at the event message buffer 100. For example, a read request may be received from an external system component. Alternatively, the event message buffer 100 may initiate a read operation if, for example, event message buffer 100 is configured to transmit the next queued event message once for every clock pulse of a clock domain with which event message buffer 100 communicates. At 504, event message buffer 100, using control circuitry 106, retrieves the next queued event message is retrieved from the event message FIFO 204. For example, control circuitry 106 may use a counter or other variable or data structure to track the storage location of event message FIFO 204 that is to be read next. Control circuitry 106 may then access the storage location and retrieve the content and/or type of the event message stored there. Alternatively, the indicated storage location may hold an identifier corresponding to a location in pending message data structure 208. Control circuitry 106 may then access pending message data structure 208 and retrieve the content and/or type of the event message from the indicated location.

At 506, control circuitry 106 retrieves the content of the previously sent event message from sent message data structure 212. For example, control circuitry 106 accesses and retrieves an identifier from the storage location of event message FIFO 204 that precedes the storage location corresponding to the next queued event message. Using the retrieved identifier, control circuitry 106 retrieved the content and/or type of the previously sent message from the corresponding location in sent message data structure 212.

At 508, control circuitry 106 determines whether the next queued event message is different from the previously sent event message. For example, control circuitry 106, using comparator 116, compares the content and/or type of the next queued event message retrieved from pending message data structure 208 with the content and/or type of the previously sent event message retrieved from sent message data structure 212. If the next queued event message is different from the previously sent event message, then, at 510, control circuitry 106 cancels sending of the next queued event message. If the next queued event message is the same as the previously sent event message, then, at 512, control circuitry 106 sends the next queued event message to the requesting component. In either case, at 514, control circuitry 106 updates the flag or Boolean variable in pending message data structure 208 to indicate that the is no pending message for the corresponding system component.

Various implementations discussed in conjunction with FIGS. 1-5 are performed by various electronic components of one or more electronic circuits, such as but not limited to an integrated circuit, and application-specific integrated circuit (ASIC), a digital signal processor (DSP), and/or the like. Various components discussed throughout this disclosure are configured to include a set of electronic circuit components, and communicatively operate on one or more electronic circuits. Each electronic circuit is configured to include any of, but not limited to logic gates, memory cells, amplifiers, filters, and/or the like.

While various implementations of the subject matter of the present disclosure have been shown and described herein, such implementations are provided by way of example only. Numerous variations, changes, and substitutions relating to implementations described herein are applicable without departing from the disclosure. It is noted that various alternatives to the implementations of the disclosure described herein may be employed in practicing the disclosure. It is intended that the following claims define the scope of the disclosure and that methods and structures within the scope of these claims and their equivalents be covered thereby.

The subject matter of this specification has been described in terms of particular aspects, but other aspects and variations can be implemented and are within the scope of the following claims.

What is claimed is:

1. A method for storing event messages in an event message buffer of a system, the method comprising:
    receiving, at control circuitry of the event message buffer, from a system component, a first event message comprising (i) a first identifier identifying the system component, and (ii) message content separate from the first identifier, the message content indicating a first status of the identified system component;
    queueing, by the control circuitry of the event message buffer, the first event message in a memory of the event message buffer;
    setting, by the control circuitry of the event message buffer, a status flag stored in a storage location associated with the identified system component, to indicate a queued event message when the first event message is queued and to indicate that an event message has been read responsive to the first event message having been read by a processor;
    receiving, at the control circuitry, from the system component, a second event message comprising (i) a second identifier identifying the system component, and (ii) message content separate from the second identifier, the message content indicating a second status of the identified system component; and
    in response to determining, by the control circuitry, based on the status flag, that the first event message has not yet been read:

comparing, using a comparator of the event message buffer, the second status of the identified system component indicated in the message content of the second event message with the first status of the identified system component indicated in the message content of the first event message; and in response to determining, by the control circuitry, based on the comparing, that the second status of the identified system component indicated in the message content of the second event message is the same as the first status of the identified system component indicated in the message content of the first event message, not queueing the second event message in the memory of the event message buffer.

2. The method of claim 1, further comprising:
identifying, by the control circuitry, based on the first identifier, the identified system component; and
queueing, by the control circuitry, the first event message in a memory location in the memory of the event message buffer corresponding to the identified system component.

3. The method of claim 1, further comprising:
determining, by the control circuitry, based on the status flag, whether the first event message has been read; and
in response to determining, by the control circuitry, that the first event message has been read, queueing, by the control circuitry, the second event message in the memory of the event message buffer.

4. The method of claim 1, further comprising:
accessing, by the control circuitry, the storage location associated with the system component; and
updating, by the control circuitry, the status flag in the storage location to indicate a queued event message.

5. The method of claim 4, wherein determining, by the control circuitry, whether the first event message has been read comprises:
accessing, by the control circuitry the storage location associated with the system component; and
determining, by the control circuitry, whether a value of the status flag stored in the storage location indicates a queued event message.

6. The method of claim 1, further comprising:
in response to determining, by the control circuitry, based on the comparing, that the second status of the identified system component indicated in the message content of the second event message is different from the first status of the identified system component indicated in the message content of the first event message, replacing, by the control circuitry, the first event message with the second event message.

7. The method of claim 6, wherein the first event message has already been read, and wherein comparing the second event message with the first event message comprises:
accessing, by the control circuitry, the message content of the second event message;
accessing, by the control circuitry, a storage location associated with the identified system component in which content of a previously-read event message is stored, the previously-read event message being the first event message; and
comparing, using the comparator, the message content of the second event message with the stored message content of the first event message.

8. The method of claim 1, further comprising:
receiving, at the control circuitry, a plurality of event messages from a plurality of system components at a first rate;

wherein event messages are read from the event message buffer at a second rate that is slower than the first rate.

9. The method of claim 1, wherein the event message buffer receives event messages from a set number of system components, and wherein the event message buffer comprises two sets of storage locations, each set of storage locations having a number of locations equal to the set number.

10. The method of claim 1, further comprising:
updating, by the control circuitry, the status flag in a first storage location associated with the identified system component to indicate a queued event message;
receiving, at the control circuitry, a read request to read an event message from the identified system component; and
in response to receiving the read request:
sending, by the control circuitry, the first event message from a corresponding queue;
updating, by the control circuitry, the status flag in the first storage location to indicate that no event message is queued in the corresponding queue; and
updating, by the control circuitry, a second storage location associated with the identified system component to reflect content of the first event message.

11. The method of claim 1, further comprising:
receiving, at the control circuitry, a read request;
in response to receiving the read request, comparing, using the comparator, the queued event message with a previously sent event message; and
sending, by the control circuitry, the queued event message only in response to determining, based on the comparing, that the queued event message is different from the previously sent event message.

12. An event message buffer comprising:
memory; and
control circuitry configured to:
receive, from a system component, a first event message comprising (i) a first identifier identifying the system component, and (ii) message content separate from the first identifier, the message content indicating a first status of the identified system component;
queue the first event message in the memory;
set a status flag stored in a storage location associated with the identified system component, to indicate a queued event message when the first event message is queued and to indicate that an event message has been read responsive to the first event message having been read by a processor;
receive, from the system component, a second event message comprising (i) a second identifier identifying the system component, and (ii) message content separate from the second identifier, the message content indicating a second status of the identified system component; and
in response to determining, based on the status flag, that the first event message has not yet been read:
compare, using a comparator, the second status of the identified system component indicated in the message content of the second event message with the first status of the identified system component indicated in the message content of the first event message; and
in response to determining, based on the comparing, that the second status of the identified system component indicated in the message content of the second event message is the same as the first status of the identified system component indicated in the message content of the first event message, not queueing the second event message in the memory.

13. The event message buffer of claim 12, wherein the control circuitry is further configured to:
   identify, based on the first identifier, the identified system component; and
   queue the first event message in a memory location of the memory corresponding to the identified system component.

14. The event message buffer of claim 12, wherein the control circuitry is further configured to:
   determine, based on the status flag, whether the first event message has been read; and
   in response to determining that the first event message has been read, queueing the second event message in the memory.

15. The event message buffer of claim 12, wherein the control circuitry is further configured to:
   access the storage location in the memory associated with the system component; and
   update the status flag in the storage location to indicate a queued event message.

16. The event message buffer of claim 15, wherein the control circuitry configured to determine whether the first event message has been read is further configured to:
   access the storage location in the memory associated with the system component; and
   determine whether a value of the status flag stored in the storage location indicates a queued event message.

17. The event message buffer of claim 12, wherein the control circuitry is further configured to, in response to determining, based on the comparing, that the second status of the identified system component indicated in the message content of the second event message is different from the first status of the identified system component indicated in the message content of the first event message, replace the first event message with the second event message.

18. The event message buffer of claim 17, wherein the first event message has already been read, and wherein the control circuitry configured to compare the second event message with the first event message is further configured to:
   access the message content of the second event message;
   access a storage location in the memory associated with the identified system component in which content of a previously-read event message is stored, the previously-read event message being the first event message; and
   compare, using the comparator, the message content of the second event message with the stored message content of the first event message.

19. The event message buffer of claim 12, wherein the control circuitry is further configured to:
   receive a plurality of event messages from a plurality of system components at a first rate;
   wherein event messages are read from the event message buffer at a second rate that is slower than the first rate.

20. The event message buffer of claim 12, wherein the event message buffer receives event messages from a set number of system components, and wherein the memory comprises two sets of storage locations, each set of storage locations having a number of locations equal to the set number.

21. The event message buffer of claim 12, wherein the control circuitry is further configured to:
   update the status flag in a first storage location in the memory associated with the identified system component to indicate a queued event message;
   receive a read request to read an event message from the identified system component; and
   in response to receiving the read request:
      send the first event message from a corresponding queue in the memory;
      update the status flag in the first storage location in the memory to indicate that no event message is queued in the corresponding queue; and
      update a second storage location in the memory associated with the identified system component to reflect content of the first event message.

22. The event message buffer of claim 12, wherein the control circuitry is further configured to:
   receive a read request;
   in response to receiving the read request, compare, using the comparator, the queued event message with a previously sent event message; and
   send the queued event message only in response to determining, based on the comparing, that the queued event message is different from the previously sent event message.

* * * * *